United States Patent
Ahmet et al.

(10) Patent No.: US 12,557,134 B2
(45) Date of Patent: Feb. 17, 2026

(54) UPLINK QUALITY BASED PROACTIVE SCHEDULING SWITCHING

(71) Applicant: T-Mobile Innovations LLC, Overland Park, KS (US)

(72) Inventors: Jeff Ahmet, Issaquah, WA (US); Jun Liu, Sammamish, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 871 days.

(21) Appl. No.: 17/834,270

(22) Filed: Jun. 7, 2022

(65) Prior Publication Data

US 2023/0397240 A1    Dec. 7, 2023

(51) Int. Cl.
| | |
|---|---|
| *H04W 72/542* | (2023.01) |
| *H04W 72/1268* | (2023.01) |
| *H04W 72/23* | (2023.01) |
| *H04W 72/543* | (2023.01) |

(52) U.S. Cl.
CPC ..... *H04W 72/542* (2023.01); *H04W 72/1268* (2013.01); *H04W 72/23* (2023.01); *H04W 72/543* (2023.01)

(58) Field of Classification Search
CPC .................................................. H04W 72/542
See application file for complete search history.

(56) References Cited

U.S. PATENT DOCUMENTS

| | | | |
|---|---|---|---|
| 8,982,846 B2 | 3/2015 | Baker et al. | |
| 9,992,739 B2 | 6/2018 | Rune | |
| 2019/0349981 A1* | 11/2019 | Sandberg | H04L 5/0087 |
| 2020/0100191 A1* | 3/2020 | Raghavan | H04B 17/12 |

* cited by examiner

*Primary Examiner* — Abdeltif Ajid
(74) *Attorney, Agent, or Firm* — Jones Robb, PLLC

(57) ABSTRACT

Systems and methods are provided for uplink quality enhancement comprising through selective proactive scheduling. Methods include setting a triggering threshold and monitoring a wireless device condition of a wireless device. Methods further include determining the wireless device condition meets the triggering threshold and activating proactive uplink scheduling for the wireless device in response to the determination.

20 Claims, 5 Drawing Sheets

UPLINK QUALITY BASED PROACTIVE SCHEDULING SWITCHING

TECHNICAL BACKGROUND

A wireless network, such as a cellular network, can include an access node (e.g., base station) serving multiple wireless devices or user equipment (UE) in a geographical area covered by a radio frequency (RF) transmission provided by the access node. As technology has evolved, different carriers within the cellular network may utilize different types of radio access technologies (RATs). RATs can include, for example, 3G RATs (e.g., GSM, CDMA etc.), 4G RATs (e.g., WiMax, LTE, etc.), and 5G RATs (new radio (NR)).

As access nodes have evolved, networks may include a combination of multiple access node such as 4G LTE evolved NodeBs (eNodeBs) and 5G NR next generation NodeBs (gNodeBs) or alternatively may be exclusively 4G or 5G cellular systems. Wireless devices closer to a 5G antenna are more likely to receive the benefits of the 5G technology. Access to high data speeds is improved if a high signal to interference and noise ratio (SINR) is present. Accordingly, when a wireless device moves further from an antenna, the wireless device is likely to experience a decrease in quality of service (QoS).

Within cellular communications, wireless devices are generally granted uplink resources through reactive scheduling, wherein the wireless device sends a request to the access node for uplink resources. Wireless devices can request uplink resources using a scheduling request, buffer status reporting, or a random access procedure. Using these procedures, the wireless device waits for the base station to grant uplink resources prior to the transmission of data.

However, a technique as evolved that allows wireless devices to be granted resources proactively, i.e., without a scheduling request or buffer status from the wireless device. Proactive scheduling offers advantages in that it allows for lower latency by removing the multi-step request procedure. When proactive scheduling is utilized, it is not necessary for the wireless device to request resources from the access node as the access node provides the wireless device with capacity on the physical uplink shared channel (PUSCH) without receiving a request. This procedure can decrease latency for the wireless device.

However, proactive scheduling also has disadvantages in that it sacrifices resource capacity and wireless device battery life as the wireless device is unnecessarily utilizing uplink (UL) resources in times it has nothing to send. Accordingly, a need exists for a solution implementing proactive scheduling in a manner calculated to leverage the advantages and avoid the disadvantages described above while maintaining wireless device QoS.

OVERVIEW

Exemplary embodiments described herein include systems, methods, access nodes, and non-transitory computer readable mediums for improving uplink performance through proactive uplink switching. An exemplary method includes setting a triggering threshold, monitoring a wireless device condition, and determining that the wireless device condition meets the triggering threshold. The method additionally includes activating proactive uplink scheduling for the wireless device in response to the determination.

A further exemplary embodiment includes an access node having at least one processor programmed to perform multiple operations in order to enhance uplink performance. The operations include setting a triggering threshold and monitoring a wireless device condition of a wireless device. The operations additionally include determining the wireless device condition meets the triggering threshold and activating proactive uplink scheduling for the wireless device in response to the determination.

In yet a further exemplary embodiment, a method is provided for uplink quality enhancement. The method includes setting an RF condition threshold and monitoring the RF condition for a wireless device. The method additionally includes determining the RF condition for the wireless device. Upon determining that the RF condition for the wireless device does not meet the threshold, the method includes implementing reactive uplink scheduling for the wireless device. Upon determining that the RF condition for the wireless device meets the threshold, the method includes implementing proactive uplink scheduling for the wireless device.

Additional exemplary embodiments include a non-transitory computer readable medium, programmed to perform the operations set forth above. In embodiments set forth herein, the proactive uplink scheduling comprises continuously allocating uplink resources to the wireless device. The reactive uplink scheduling includes a multi-step uplink scheduling process instigated by the wireless device including a scheduling request from the wireless device to an access node and an uplink grant from the access node to the wireless device.

DETAILED DESCRIPTION

Figure 1:
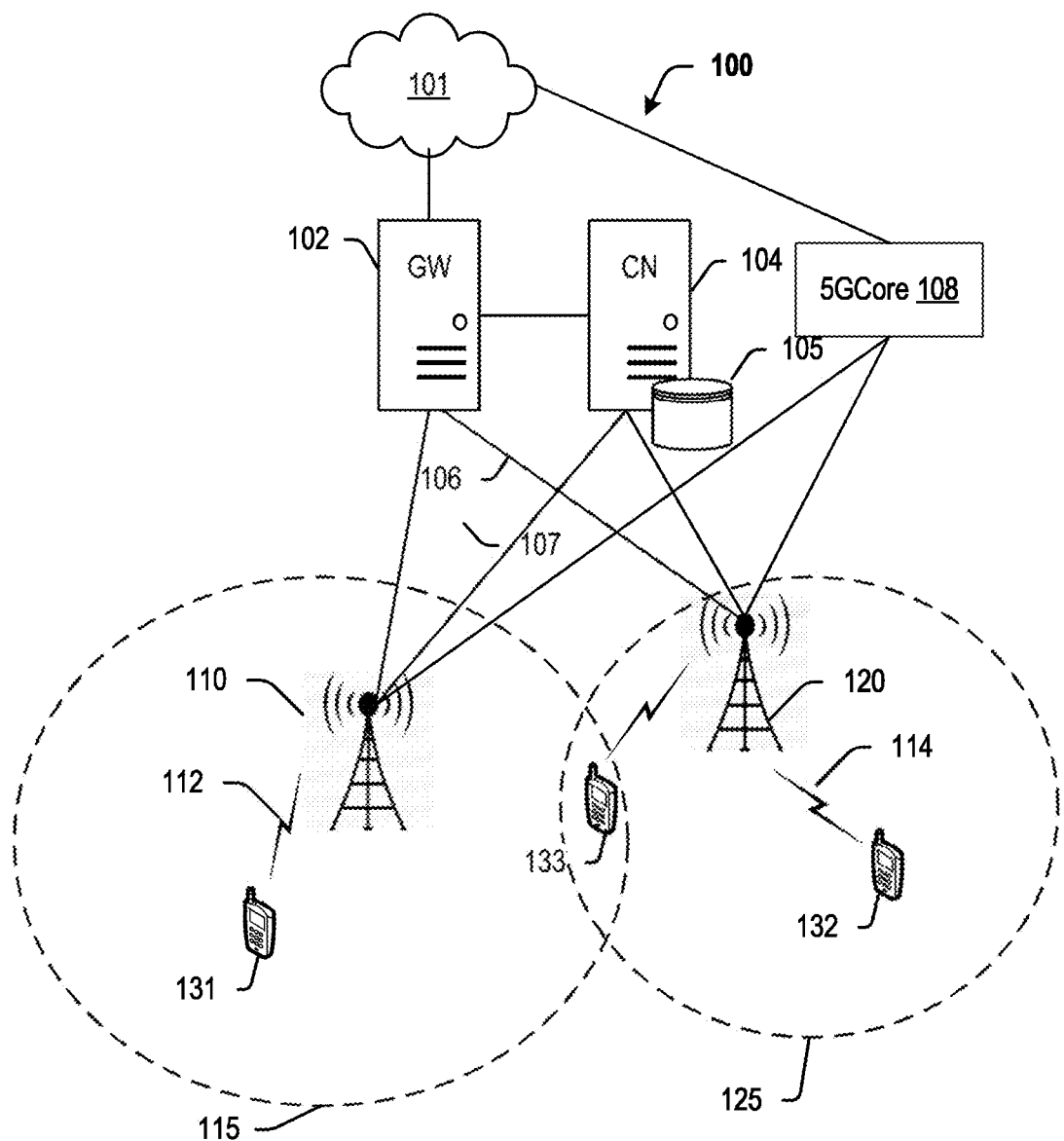
FIG. 1 depicts an exemplary system for wireless communication, in accordance with the disclosed embodiments.

Exemplary embodiments described herein include systems, methods, and computer readable mediums for improving uplink quality by dynamically selecting an uplink scheduling method In particular, embodiments set forth herein include enhanced logic for evaluating a performance parameter for a wireless device in comparison to a threshold and dynamically selecting an uplink scheduling mode for the wireless device based on whether the performance parameter meets a particular threshold.

In embodiments provided herein, enhanced logic dynamically enables a proactive scheduling method for a wireless device when the performance parameter meets a predetermined threshold. When the proactive scheduling method is enabled, the wireless device is not required to send a scheduling request in order to utilize uplink resources. When the performance parameter does not meet the threshold, then the wireless device is required to use reactive scheduling. Thus, the wireless device is required to send a request to the access node for permission to utilize uplink resources. While the reactive scheduling mode may create greater latency than the proactive scheduling mode, it also utilizes fewer uplink resources.

Thus, the use of proactive scheduling allows for lower latency as it removes the request procedure. However, proactive scheduling sacrifices capacity and wireless device battery life while the wireless device is unnecessarily utilizing uplink resources in times it has nothing to send. When the wireless device experiences poor RF conditions, uplink proactive scheduling allows for a more accurate UL power control and more robust data transmission as the device remains active. Poor RF conditions may be experienced, for example, at cell edge areas, in areas of overlapping coverage, or in an overloaded cell. Accordingly, embodiments set forth herein include a mechanism that dynamically activates and deactivates proactive scheduling, based on UL radio conditions. The dynamic activation and deactivation may be further based on device power availability. Thus, embodiments set forth herein provide more robust UL transmission and better power control estimation in areas of poor coverage, such as a cell edge area, when the wireless device is power limited.

Accordingly, in embodiments set forth herein, when wireless device users reach marginal areas of coverage, the system provides the wireless device with better performance by utilizing proactive scheduling. However, because proactive scheduling utilizes uplink resources when unnecessary and can negatively impact device battery power, embodiments set forth herein implement a switching function to disable proactive scheduling in favorable RF conditions. Accordingly, in more favorable RF conditions, when the wireless device wants uplink resources, it will perform a scheduling request by sending a message to the access node. The access node responds with an allocated time frame, which the wireless device will typically accept and the network will acknowledge. In contrast, in less favorable conditions, the access node continuously allocates uplink resources to the wireless device. This process allows the devices to send padding bits when it has nothing to send and avoids the need for the device to send scheduling requests. Further, proactive scheduling provides improved channel estimation from the access node to the device and decreases chances for service interruption. When the access node leaves a channel open for the wireless device, this improves channel estimation and provides more reliable service to the wireless device.

In embodiments set forth herein, the access node sets a trigger threshold for activating and deactivating proactive scheduling. The trigger threshold can be based on downlink or uplink measurements. For example, the trigger threshold can be based on, for example, uplink noise, uplink quality, power left in the wireless device, reference signal received power (RSRP), reference signal received quality (RSRQ), or signal to noise and interference ratio (SINR). Additionally, the trigger threshold can incorporate a wireless device location, e.g., distance from the access node, or remaining wireless device battery power into the trigger threshold.

Thus, in embodiments set forth herein, a dynamic switching mechanism switches between proactive and reactive scheduling based on a threshold comparison. Generally, wireless devices within a certain proximity to an access node will use reactive scheduling and wireless devices further from the access node or in an overlapping coverage area or area with interference will utilize proactive scheduling. Further, the process described herein serves to conserve battery and processing power for wireless devices and improve latency.

In embodiments disclosed herein, a cell or wireless network may be provided by an access node. The access node may utilize one or more antennas to communicate with wireless devices or user equipment (UEs). Performance at a particular wireless device may be dependent on a number of factors including, for example, signal strength parameters and interference indicators. Values such as SINR, RSRP, RSRQ, or other measurements may be periodically measured and reported by the wireless devices over a communication network to an access node. Additional signal performance parameters may be reported, including, for example, channel quality indicator (CQI), and rank index (RI).

By selecting a particular uplink scheduling mode based on performance parameters of the wireless device, performance is maintained for wireless devices in the network and overhead and latency are reduced. Other triggers may alternatively be utilized as the performance of a wireless device may be dependent on a number of factors including, for example, antenna performance parameters, network loading conditions, and wireless device location within a cell or a sector. Thus, as described herein, detecting the triggering event may include detecting a signal strength meeting a predetermined threshold. For example, RSRP or SINR at the wireless device may diminish to a level such that the connection is interrupted. However, when wireless devices move closer to an access node and no interference is present, the signal strength increases. When signal strength for a wireless device meets a predetermined network defined threshold, proactive scheduling may be disabled and reactive scheduling may be enabled. Further, the signal strength may be monitored on a continual basis, such that when the signal strength for the wireless device deteriorates, proactive scheduling may again be enabled.

In embodiments set forth herein, the network may be a 4G LTE network 5G NR network or a combined 4G/5G network. Other networks are within scope of the disclosure. Wireless devices may travel throughout the network measuring and reporting performance parameters. Methods performed herein may be performed in response to the receipt and processing of measured performance parameters from the wireless devices. The access node, for example a gNodeB, may signal the wireless device and instruct it regarding proactive or reactive scheduling.

The term "wireless device" refers to any wireless device included in a wireless network. For example, the term "wireless device" may include a relay node, which may communicate with an access node. The term "wireless device" may also include an end-user wireless device, which may communicate with the access node through the relay node. The term "wireless device" may further include an end-user wireless device that communicates with the access node directly without being relayed by a relay node.

The terms "transmit" and "transmission" in data communication may also encompass receive and receiving data. For example, "data transmission rate" may refer to a rate at which the data is transmitted by a wireless device and/or a rate at which the data is received by the wireless device.

An exemplary system described herein includes at least an access node (or base station), such as an eNodeB, or gNodeB, and a plurality of end-user wireless devices. For illustrative purposes and simplicity, the disclosed technology will be illustrated and discussed as being implemented in the communications between an access node (e.g., a base station) and a wireless device (e.g., an end-user wireless device). It is understood that the disclosed technology may also be applied to communication between an end-user wireless device and other network resources, such as relay nodes, controller nodes, antennas, etc. Further, multiple access nodes may be utilized. For example, some wireless devices may communicate with an LTE eNodeB and others may communicate with an NR gNodeB.

In addition to the systems and methods described herein, the operations for selecting a scheduling mode may be implemented as computer-readable instructions or methods and processing nodes on the network for executing the instructions or methods. The processing node may include a processor included in the access node or a processor included in any controller node in the wireless network that is coupled to the access node.

FIG. 1 depicts an exemplary system 100 for use in conjunction with embodiments disclosed herein. System 100 comprises a communication network 101, gateway 102, controller node 104, 5G core 108, access nodes 110 and 120, and wireless devices 131, 132, and 133. Access node 110 is illustrated as having a coverage area 115, and access node 120 is illustrated as having a coverage area 125. As illustrated, the coverage area 115 may be larger than the coverage area 125. This may result from the access node 110 having higher power transmission capabilities than the access node 120. For example, the access node 120 may be capable of a 320 W downlink transmission power and the access node 120 may be capable of a 120 W downlink transmission power.

Wireless device 131 is located within coverage area 115 and accesses network services using a wireless communication link 112 from access node 110. Wireless device 132 is located within coverage area 125 and accesses network services from access node 120 via another wireless communication link 114. Further, wireless device 133 is located within overlapping coverage area formed by an overlap of coverage areas 115, 125. For example, access nodes 110, 120 may be configured to deploy individual sectors and the overlapping coverage area may comprise any overlapping coverage area of the sectors. The wireless devices 131, 132, and 133 may travel between the coverage areas 115 and 125, thus being variously connected to access nodes 110 and 120.

In the illustration of FIG. 1, both the first access node 110 and the second access node may be connected to the communication network 101 via both an LTE path (including the gateway node 102) and an NR path (including the 5G core 108). However, in practical implementations one or both of the first access node 110 and the second access node 120 may be connected to the communication network 101 via only a single RAT path. In any event, the first access node and the second access node 110, 120 communicate with the gateway node 102, the controller node 104, and/or the 5G core 108 via respective communication links, each of which may be a direct link (e.g., an X2 link or the like).

Access nodes 110, 120 can be any network node configured to provide communication between wireless devices 131, 132, 133 and communication network 101, including standard access nodes and/or short range, low power, small access nodes. For instance, access nodes 110, 120 may include any standard access node, such as a macrocell access node, base transceiver station, a radio base station, gNodeBs, eNodeBs, or the like. In an exemplary embodiment, a macrocell access node can have a coverage area 115, 125 in the range of approximately five kilometers to thirty five kilometers and an output power in the tens of watts. In other embodiments, access nodes 110, 120 can be a small access node including a microcell access node, a picocell access node, a femtocell access node, or the like such as a home NodeB or a home eNodeB device. Moreover, it is noted that while access nodes 110, 120 are illustrated in FIG. 1, any number of access nodes can be implemented within system 100.

Access nodes 110, 120 can comprise processors and associated circuitry to execute or direct the execution of computer-readable instructions to perform operations such as those further described herein. Briefly, access nodes 110, 120 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access nodes 110, 120 can receive instructions and other input at a user interface. Access nodes 110, 120 communicate with gateway node 102 and controller node 104 via communication links 106, 107. Access nodes 110, 120 may communicate with each other and with other access nodes (not shown) using a direct link such as an X2 link or similar.

Wireless devices 131, 132, 133 may be any device, system, combination of devices, or other such communication platform capable of communicating wirelessly with access nodes 110, 120 using one or more frequency bands deployed therefrom. Wireless devices 131, 132, 133 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access nodes 110, 120. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 131-133. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. Communication links 106, 107 may include S1 communication links. Other wireless protocols can also be used. Communication links 106, 107 can be a direct link or might include various equipment, intermediate components, systems, and networks. Communication links 106, 107 may comprise many different signals sharing the same link.

Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) or 5G NR can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) or 5G NR can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information, such as location information for overlapping coverage area 135, positions of wireless devices 131, 132, 133, transmission power capabilities, scheduling schemes and resource allocations for each of access nodes 110, 120 and wireless devices connected thereto, and so on. This information may be requested by or shared with access nodes 110, 120 via communication links 106, 107, X2 connections, and so on. The software comprises computer programs, firmware, or some other form of machine-readable instructions, and may include an operating system, utilities, drivers, network interfaces, applications, or some other type of software, and combinations thereof. Controller node 104 can receive instructions and other input at a user interface.

Further, a scheduling entity (within, for example, one or both of access nodes 110, 120, or controller node 104) may be configured to allocate resources and select a scheduling method, which may be a proactive or reactive scheduling method, in accordance with embodiments set forth herein, thereby improving wireless device performance throughout the coverage area.

The core 108 as shown is an optional configuration. While separate 4G and 5G core components may be included, it should be understood that various embodiments of the network may include a core implementing only one RAT, and that the elements described below may, for example, be part of the controller node 104 or the gateway node 102. The core 108 may be a 5G core collectively implementing several control plane network functions (NFs) and user plane NFs. The control plane NFs include but are not limited to a Network Slice Selection Function (NSSF), a Network Exposure Function (NEF), a NF Repository Function (NRF), a Policy Control Function (PCF), a Unified Data Management (UDM), an Application Function (AF), a Short Message Service Function (SMSF), a Core Access and Mobility management Function (AMF), a Session Management Function (SMF), and an Authentication Server Function (AUSF). The user plane NFs include but are not limited to a Unified Data Repository (UDR) and a UPF. Control plane NFs can provide one or more NFs based on a request-response or subscribe-notify model. The NFs may form a micro services-based architecture, which may include network functions distributed over different cloud infrastructures. Additionally, many services may span different network functions and domains that work in unison.

The NRF maintains the list of available network functions and their profiles. The NRF maintains an updated repository of the network components along with services provided by each of the elements in the core network. The NRF additionally provides a discovery mechanism that allows the elements to discover each other. The NRF provides a registration function that allows each network function to register a profile and a list of services with the NRF. It also performs services registration and discovery so that different network functions can find each other. As one example, the SMF, which is registered to NRF, becomes discoverable by the AMF when a UE or other device tries to access a service type served by the SMF. The NRF broadcasts available services once they are registered in the 5G core 108. To use other network functions, registered functions can send service requests to the NRF.

The UDM interfaces with NFs such as AMF and SMF so that relevant data becomes available to AMF and SMF. The UDM generates authentication vectors when requested by the AUSF, which acts as an authentication server. The AMF performs the role of access point to the 5G core 108, thereby terminating RAN control plane and UE traffic originating on either the N1 or N2 reference interface. In the 5G core 108, the functionality of the 4G Mobility Management Entity (MME) is decomposed into the AMF and the SMF. The AMF receives all connection and session related information from the UE using N1 and N2 interfaces, and is responsible for handling connection and mobility management tasks.

The UDR may provide unified data storage accessible to both control plane NFs and user plane NFs. Thus, the UDR may be a repository shared between control plane NFs and the UPF. The UDR may include information about subscribers, application-specific data, and policy data. The UDR can store structured data that can be exposed to an NF. The UPF may perform operations including, but not limited to, packet routing and forwarding, packet inspection, policy enforcement for the user plane, Quality-of-Service (QoS) handling, etc. When compared with 4G EPC, the functions of the UPF may resemble those of the SGW-U (Serving Gateway User Plane function) and PGW-U (PDN Gateway User Plane function).

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access nodes 110, 120 and communication network 101.

The methods, systems, devices, networks, access nodes, and equipment described herein may be implemented with, contain, or be executed by one or more computer systems and/or processing nodes. The methods described above may also be stored on a non-transitory computer readable medium. Many of the elements of communication system 100 may be, comprise, or include computers systems and/or processing nodes, including access nodes, controller nodes, and gateway nodes described herein.

Figure 2:
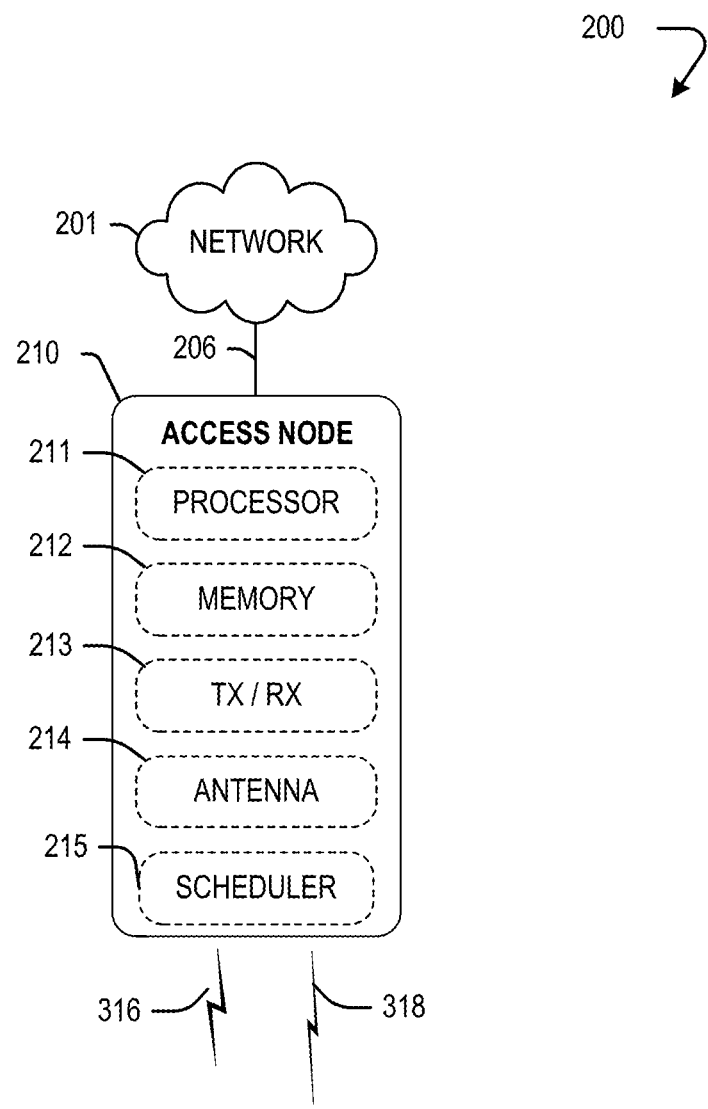
FIG. 2 depicts an access node in accordance with disclosed embodiments.

FIG. 2 illustrates an exemplary access node 210 in accordance with the disclosed embodiments. In exemplary embodiments, access node 210 can include, for example, a gNodeB or an eNodeB. Access node 210 may comprise, for example, a macro-cell access node, such as access nodes 110 or 120 described with reference to FIG. 1. Access node 210 is illustrated as comprising a processor 211, memory 212, transceiver(s) 213, and antenna(s) 214. Processor 211 executes instructions stored on memory 212, while transceiver(s) 213 and antenna(s) 214 enable wireless communication with other network nodes, such as wireless devices and other nodes. For example, wireless devices may initiate uplink transmissions such that the transceivers 213 and antennas 214 receive messages from the wireless devices, for example, over communication links 216 and 218 and pass the messages to a mobility entity in the core network. Further, the transceivers 213 and antennas 214 receive signals from the mobility entity such as an MME or AMF and pass the messages to the appropriate wireless device Scheduler 215 may be provided for scheduling resources based on the presence and performance parameters of the wireless devices. Network 201 may be similar to network 101 discussed above.

In embodiments provided herein, processor 211 may operate in conjunction with scheduler 215 to compare a performance parameter of a wireless device, such as, for example, SINR or RSRP, to a threshold stored in the memory 212 or in an accessible database to determine if the performance parameter of the wireless device meets the threshold. In embodiments provided herein, meeting the threshold is a triggering event for altering a default scheduling mechanism. For example, reactive scheduling may be the default scheduling mechanism. However, when the performance parameter meets the threshold, the processor 211 and scheduler 215 may determine that reactive uplink scheduling should be disabled and that the wireless device should rely on proactive uplink scheduling. Further, the access node 210 may continuously allocate uplink resources to the wireless device in order to enable the proactive scheduling. The access node 210 may then utilize transceiver 213 and antenna 214 to send an instruction to the wireless device in order to disable reactive scheduling. The scheduler 215 may operate in a media access control (MAC) layer of the protocol stack, which is a set of protocols used in a communications network and includes a hierarchy of software layers residing in each client and server.

Figure 3:
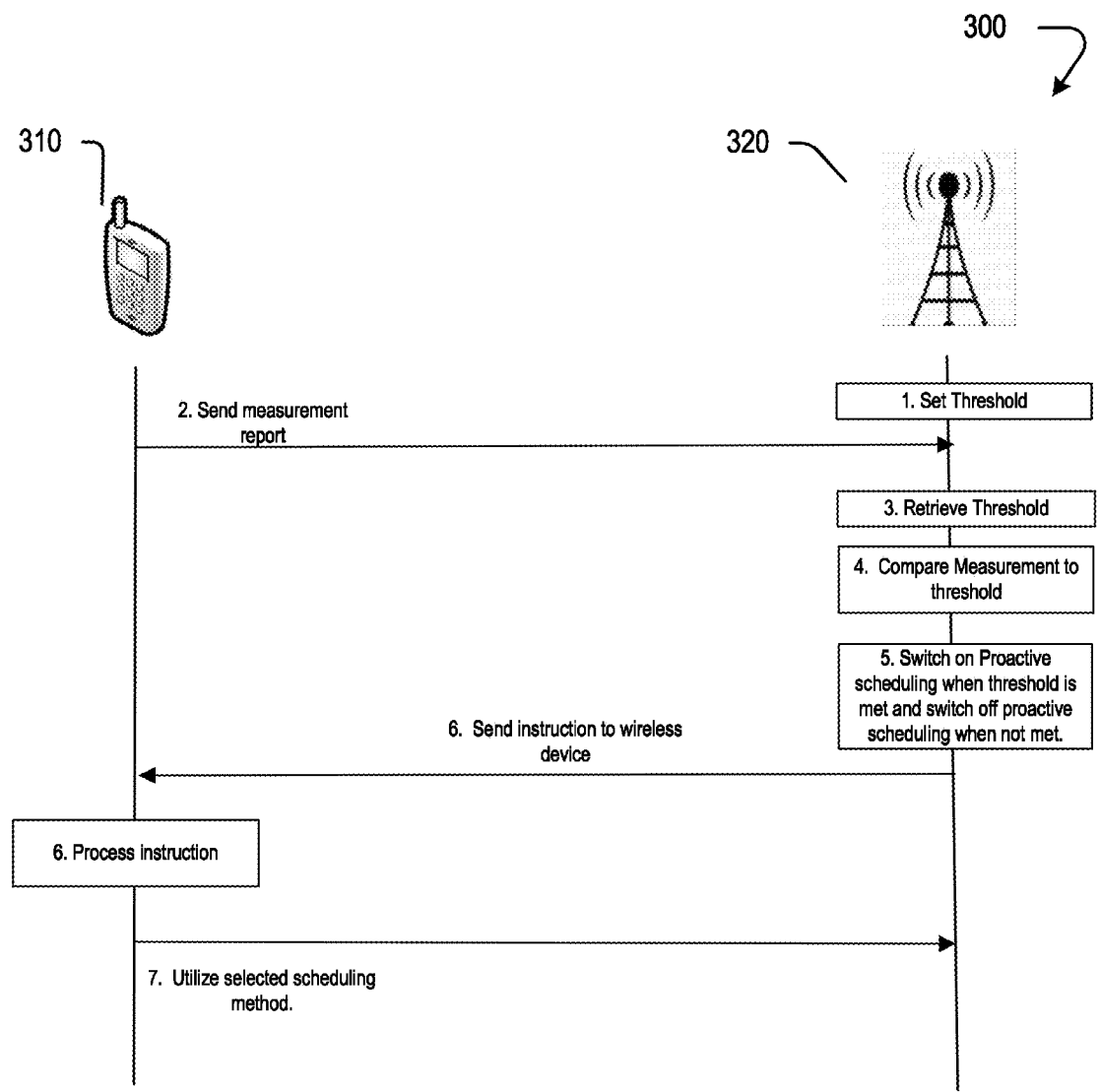
FIG. 3 is a flow diagram depicting an access node and wireless device selecting a scheduling mode in accordance with disclosed embodiments.

FIG. 3 is a flow diagram 300 further illustrating interaction between a wireless device 310 and an access node 320 in accordance with embodiments described herein. In step 1, the access node 320 sets a threshold as described above. The threshold may simply be or include a parameter value or may be or include a combination of parameter values reflective of RF conditions. The threshold may further incorporate a wireless device distance from the access nodes and a measure of remaining wireless device battery power.

In step 2, the wireless device 310 sends a measurement report including a performance parameter to the access node 320. In order to avoid prolonged decreases in QoS or other performance parameters, wireless devices periodically send channel status information (CSI) reports to an access node in the network. The CSI report tells the access node how good or bad a channel is at a specific time. The CSI report may contain for example, a channel quality indicator (CQI), a precoding matrix index (PMI), and a rank indicator (RI), CSI-RS Resource Indicator (CRI), SS/PBCH Resource Block Indicator (SSBRI), and layer indicator (LI) as well as other measurements. Often, the wireless devices report in a periodic time interval configured by a higher layer. In various embodiments, step 2 may be omitted or altered to be performed by the access node 320, which may be capable of making its own measurements for the wireless device 310. Further, any of multiple parameters indicating conditions may be utilized by the access node 320. For example, the condition may be determined by RSRP, RSRQ, uplink noise, SNR and/or SINR. Further, the access node 320 may consider wireless device location and remaining wireless device power.

In step 3, the access node 320 retrieves the performance parameter threshold and in step 4, the access node 320 compares the received measurement or measurements to the stored threshold. In step 5, the access node 320 selects a scheduling method based on the comparison. The scheduling method may be either a proactive or reactive scheduling method.

In step 6, the access node 320 sends an instruction to the wireless devices to use the selected scheduling method. Finally, in step 7, the wireless device 310 utilizes proactive or reactive scheduling as instructed. For example, if the wireless device 310 is instructed to use reactive scheduling because the performance parameter does not meet the threshold, the wireless device 310 sends a request for uplink resources to the access node 320. In this case, when the wireless device 310 has data to be transmitted, it can ask the access node 320 for uplink resources, for example, by sending a scheduling request message over the physical uplink control (PUCCH) channel. The access code node 320 may respond with an uplink grant. Thus, the wireless device 310 initiates a multi-step uplink scheduling process for scheduling uplink resources for the wireless device 310. However, if the wireless device 310 is instructed to use proactive scheduling, the access node 320 allocates uplink resources to the wireless device 310, such that the wireless device 310 uses uplink resources already available to transmit information on an uplink channel. When utilizing proactive scheduling, the access node 320 continuously allocates uplink resources to the wireless device 310.

In the scenario described herein, the wireless device 310 may, for example, be moving closer to the access node 320. Thus, at a location close to the access node 320, the wireless device 310 may send a performance parameter that shows improving RF conditions. Thus, in selecting the scheduling mode in step 5, the access node 320 may disable the proactive scheduling mode and cease to continuously allocate uplink resources to the wireless device 310. Accordingly, the instruction may inform the wireless device 310 that proactive uplink scheduling has been disabled and instruct the wireless device 310 to use reactive scheduling. The reactive scheduling requires a multi-step uplink scheduling process instigated by the wireless device 310, for example, through a scheduling request from the wireless device 310 to the access node 320 and an uplink grant from the access node 320 to the wireless device 310.

However, when the wireless device 310 is further from the access node 320 or an area with interference from a neighboring cell, the performance parameter measured by the wireless device 310 may indicate deteriorating RF conditions and the performance parameter may meet the predetermined threshold. In this case, the wireless device 310 may be instructed that proactive uplink scheduling has been enabled, such that the access node 320 continuously allocates uplink resources to the wireless device 310. Accordingly, the procedure described herein may allow the wireless device 310 to utilize uplink resources without request in order to reduce latency and improve wireless device performance.

Figure 4:
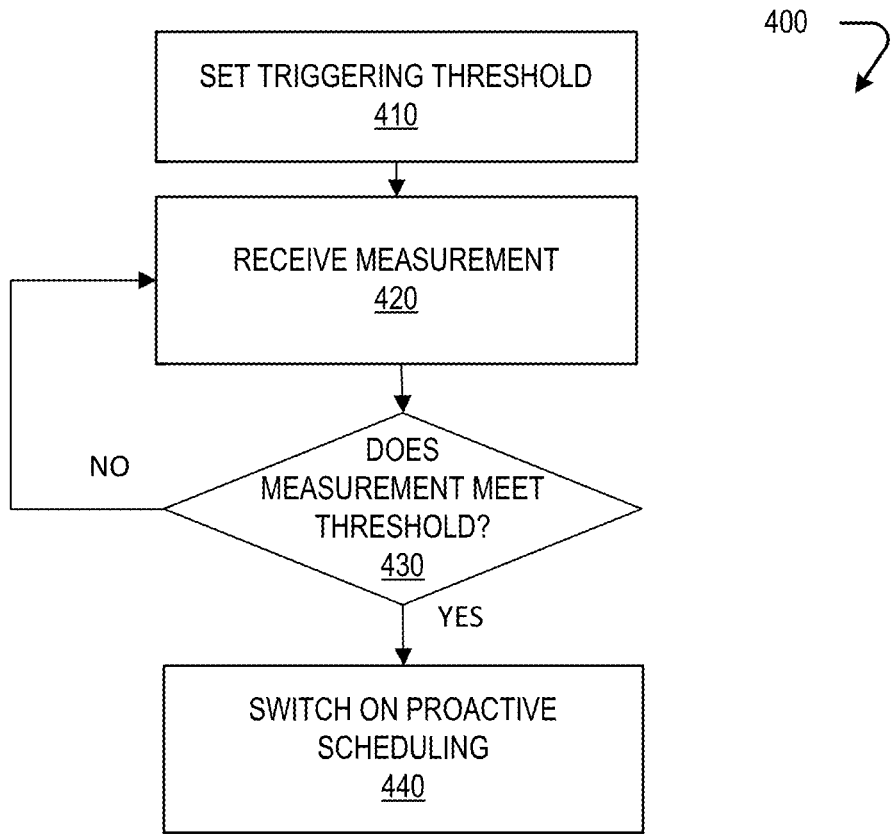
FIG. 4 is a flow chart depicting a method for selectively implementing proactive uplink scheduling in accordance with disclosed embodiments.

The disclosed methods for uplink scheduling switching are further described with reference to FIGS. 4 and 5 below. FIG. 4 illustrates an exemplary method 400 performed by an access node for selective uplink scheduling switching. Method 400 may be performed by any suitable processor discussed herein, for example, the processor 211 included in the access node 210 or a processor included in a controller node. For the sake of convenience, the method is described as being performed by the access node 320.

Method 400 starts in step 410, the access node 320 sets a threshold as explained above. The threshold may equate to a value of a single RF parameter or may involve a combination of RF parameters, such as for example, uplink noise, SINR, SNR, RSRQ, or RSRP. The threshold may further be set based on device location (e.g., a predetermined distance from the access node), and device battery power available.

In step 420, the access nodes receives a measurement report from the wireless device 310 after the wireless device 310 transmits a measured performance parameter to the access node 320. The measured performance parameter may, for example, be a SINR measurement or any of the parameters utilized in setting the threshold of step 410. The measurement may be made by the wireless device 310 and may be sent periodically by the wireless device 310 to the access node 320. The transmission may be part of a radio resource control (RRC) connect request sent by the wireless device 310 or may be simultaneous with a CSI report. Alternatively, the wireless device 310 may send the performance parameter at a scheduled interval or based on an internally stored threshold of a distance moved, a location reached, a time expired, or other trigger. In further embodiments, the access node 320 makes its own measurement of applicable RF parameters and other values used in setting the threshold.

In step 420, the access node 320 receives the measurement and compares the measurement to a stored threshold. The threshold may be stored in a database accessible to the access node 320 and may be stored in a memory of the access node. The threshold may be set network wide, or for a specific cell or sector.

In step 430, the access node 320 determines if the measured parameter received from the wireless device 310 meets the stored threshold. For example, if the measured parameter is SINR, when the wireless device 310 is moving further from the access node 320, the measured SINR may meet the stored threshold. If the measured SINR meets the stored threshold in step 430, the access node enables proactive scheduling in step 440, thereby allowing the wireless device 310 to utilize uplink resources without a scheduling request or buffer status report. Accordingly, the access node 320 continuously allocates uplink resources to the wireless device 310 as long as the threshold is met in step 440.

Accordingly, in the embodiment described with respect to FIG. 4, more robust data transmission is provided for the wireless device 310 so that the device remains active while it is in a location experiencing poor RF conditions. Further, more accurate UL power control is enabled for the wireless device 310. Further, the embodiment in FIG. 4 assumes that the network default uplink transmission mechanism is reactive and therefore, the wireless device 310 uses a reactive uplink transmission method until poor RF conditions meeting the threshold are reached.

Figure 5:
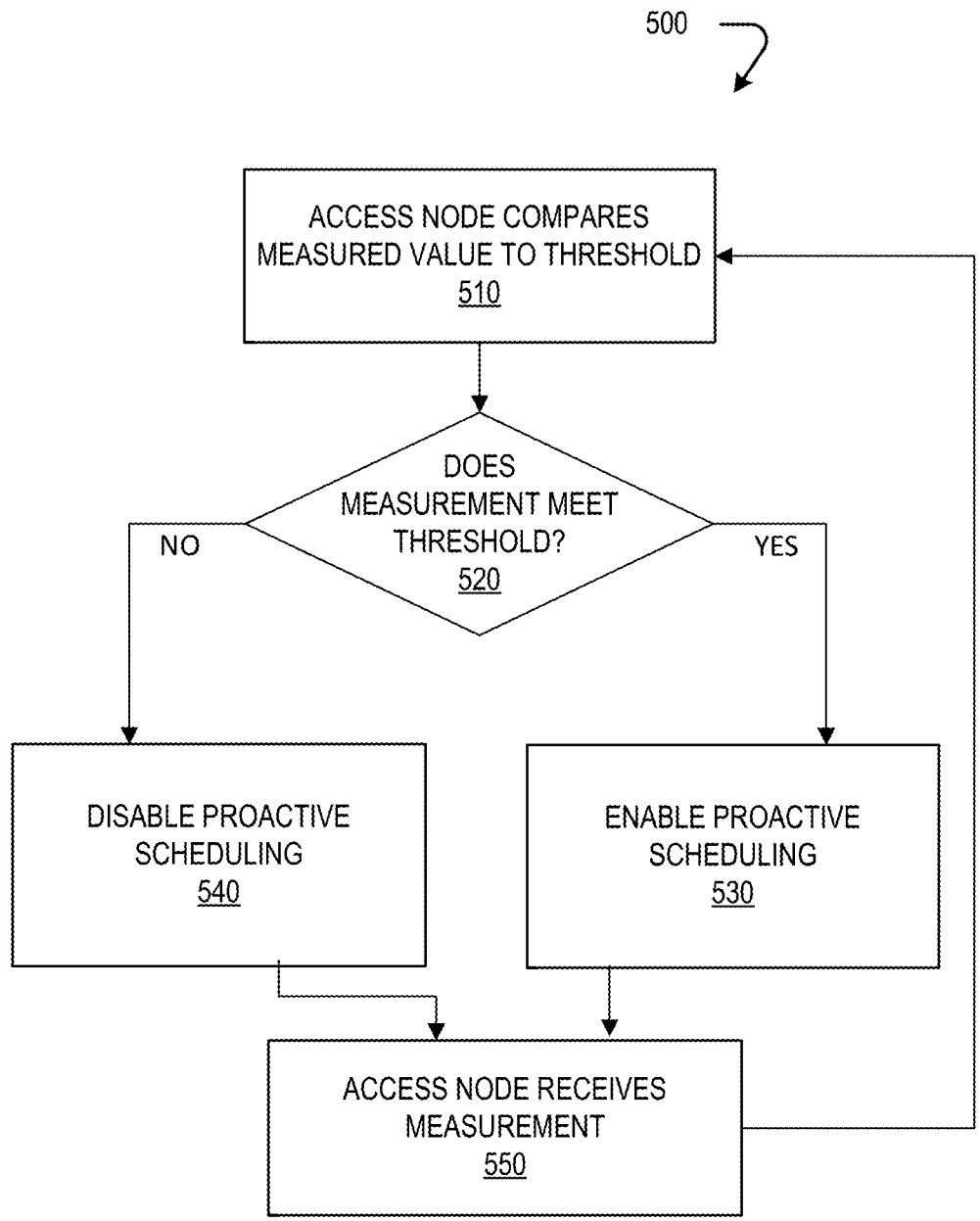
FIG. 5 is a flow chart depicting an additional method for selectively implementing proactive uplink scheduling in accordance with disclosed embodiments.

FIG. 5 illustrates a method 500 for selective uplink scheduling switching. Method 500 may be performed by an access node, for example by the processor 211 of the access node 210. For the sake of illustration, the method is described as being performed by the access node 320 interacting with multiple wireless devices, such as wireless device 310. Although only one wireless device 310 is shown as interacting with the access node 320, it should be understood that the access node 320 interacts with multiple wireless devices, such as, for example wireless devices 131, 132, and 133. In some embodiments, the method 500 may be performed in a network under any conditions and in other embodiments, the method 500 may only be performed in a network experiencing load below a predetermined loading threshold.

In step 510, the access node 320 compares the measured performance parameter value to a stored threshold. In embodiments set forth herein, the access node 320 may receive the measured performance parameter from the wireless device 310. However, in other embodiments, the access node 320 may perform its own measurements or retrieve stored measurements.

In step 520, the access node 320 determines if the measured performance parameter meets the stored threshold. For example, the access node 320 may compare a measured value of SINR or RSRP with a stored threshold. If the measured value meets the threshold in step 520, the access node 320 may enable proactive scheduling for the wireless device 310 in step 530. When proactive scheduling is enabled for the wireless device 310, the access node 320 continuously allocates uplink resources to the wireless device 310 so that the wireless device 310 is not required to send a scheduling request or buffer status report in order to transmit uplink data. In some embodiments, the access node 320 sends a message to the wireless device 310 instructing the wireless device 310 that proactive scheduling has been enabled, assuming that the default mode for the network is to utilize reactive scheduling when RF conditions are good and the measured parameter does not meet the threshold.

Thus, if the measured performance parameter does not meet the stored threshold in step 550, the access node 320 may disable proactive scheduling in step 540 and cause the wireless device 310 to revert to reactive scheduling. Thus, when proactive scheduling is disabled and reactive scheduling is enabled, the wireless device 310 is required to send a scheduling request or other request to the access node 320 in order to gain access to uplink resources. Thus, in some instances, the wireless device 310 may be moving closer to the access node 320 and the performance parameter may no longer meet the predetermined threshold.

Finally, in step 550, the access node 320 continues to receive measured performance parameters from multiple wireless devices or continues to acquire or generate measured performance parameters for the wireless devices communicating with the access node 320.

In some embodiments, methods 400 and 500 may include additional steps or operations. Furthermore, the methods may include steps shown in each of the other methods. As one of ordinary skill in the art would understand, the methods 400 and 500 may be integrated in any useful manner.

By the methods described herein, wireless device performance can be improved by utilizing selective uplink scheduling switching. Further, the customer service level for both 4G and 5G networks will improve in various scenarios.

The exemplary systems and methods described herein may be performed under the control of a processing system executing computer-readable codes embodied on a computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium may also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for uplink quality enhancement comprising:
setting a triggering threshold for triggering a proactive uplink scheduling mode for a wireless device, the triggering threshold being based on signal strength;
monitoring a signal strength at the wireless device;
determining the wireless device signal strength has deteriorated and meets the triggering threshold; and
activating proactive uplink scheduling for the wireless device in response to the determination, wherein proactive uplink scheduling includes continuous allocation of uplink resources by an access node to the wireless device.

2. The method of claim 1, further comprising determining the wireless device condition does not meet the triggering threshold and switching from proactive uplink scheduling to reactive uplink scheduling, the reactive uplink scheduling using a multi-step uplink scheduling process initiated by the wireless device for scheduling uplink resources for the wireless device.

3. The method of claim 2, wherein the multi-step uplink scheduling process instigated by the wireless device comprises a scheduling request from the wireless device to an access node and an uplink grant from the access node to the wireless device.

4. The method of claim 1, wherein the proactive uplink scheduling comprises continuously allocating uplink resources to the wireless device until the triggering threshold is no longer met.

5. The method of claim 1, wherein the triggering threshold is defined by at least one radio frequency (RF) parameter.

6. The method of claim 5, wherein the RF parameter includes at least one of reference signal received power (RSRP) and reference signal received quality (RSRQ).

7. The method of claim 6, wherein the RF parameter comprises an uplink noise measurement.

8. The method of claim 6, wherein the RF parameter is one of a signal to noise ratio (SNR) and signal to interference plus noise ratio (SINR).

9. The method of claim 1, wherein the triggering threshold additionally includes a measure of remaining wireless device power.

10. An access node comprising:
at least one processor programmed to perform operations including;
setting a triggering threshold for triggering a proactive uplink scheduling mode for a wireless device experiencing poor signal conditions, the triggering threshold being based on signal strength;
monitoring a signal strength at the wireless device;
determining the signal strength at the wireless device meets the triggering threshold; and
activating proactive uplink scheduling for the wireless device in response to the determination, wherein proactive uplink scheduling includes continuous allocation of uplink resources by the access node to the wireless device.

11. The access node of claim 10, the operations further comprising determining the wireless device condition does not meet the triggering threshold and switching from proactive uplink scheduling to reactive uplink scheduling, the reactive uplink scheduling using a multi-step uplink scheduling process initiated by the wireless device for scheduling uplink resources for the wireless device.

12. The access node of claim 11, wherein the multi-step uplink scheduling process instigated by the wireless device comprises a scheduling request from the wireless device to the access node and an uplink grant from the access node to the wireless device.

13. The access node of claim 10, wherein the proactive uplink scheduling comprises continuously allocating uplink resources to the wireless device until the triggering threshold is no longer met.

14. The access node of claim 10, wherein the triggering threshold is defined by at least one radio frequency (RF) parameter.

15. The access node of claim 14, wherein the RF parameter includes at least one of reference signal received power (RSRP) and reference signal received quality (RSRQ).

16. The access node of claim 14, wherein the RF parameter comprises an uplink noise measurement.

17. The access node of claim 14, wherein the RF parameter is one of a signal to noise ratio (SNR) and signal to interference plus noise ratio (SINR).

18. A method for uplink quality enhancement comprising:
setting a radio frequency (RF) condition threshold;
monitoring an RF condition for a wireless device;
comparing the monitored RF condition to the RF condition threshold; and
implementing reactive uplink scheduling for the wireless device when the RF condition for the wireless device does not meet the RF condition threshold and implementing proactive uplink scheduling for the wireless device when the RF condition of the wireless device meets the RF condition threshold, wherein proactive uplink scheduling includes continuous allocation of uplink resources by the access node to the wireless device and wherein the RF condition at the wireless device is worse during proactive uplink scheduling than during reactive uplink scheduling.

19. The method of claim 18, wherein the proactive uplink scheduling comprises continuously allocating uplink resources to the wireless device until the RF condition threshold is no longer met.

20. The method of claim 18, wherein the reactive uplink scheduling comprises a multi-step uplink scheduling process instigated by the wireless device including a scheduling request from the wireless device to an access node and an uplink grant from the access node to the wireless device.

\* \* \* \* \*